United States Patent
Eo et al.

(10) Patent No.: US 10,752,245 B2
(45) Date of Patent: Aug. 25, 2020

(54) AUTO CRUISE CONTROL METHOD AND SYSTEM FOR HYBRID ELECTRIC VEHICLE

(71) Applicants: Hyundai Motor Company, Seoul (KR); Kia Motors Corporation, Seoul (KR)

(72) Inventors: Jeong Soo Eo, Gyeonggi-do (KR); Young Joon Chang, Gyeonggi-do (KR); Ji Won Oh, Gyeonggi-do (KR); Youn Kwang Jung, Gyeonggi-do (KR); Sung Jae Kim, Gyeonggi-do (KR); Ba Ro Hyun, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 471 days.

(21) Appl. No.: 15/806,029

(22) Filed: Nov. 7, 2017

(65) Prior Publication Data
US 2018/0162397 A1    Jun. 14, 2018

(30) Foreign Application Priority Data
Dec. 8, 2016   (KR) ................. 10-2016-0166463

(51) Int. Cl.
*B60W 30/14* (2006.01)
*B60W 10/26* (2006.01)
(Continued)

(52) U.S. Cl.
CPC ........... *B60W 30/146* (2013.01); *B60L 15/20* (2013.01); *B60L 15/2045* (2013.01);
(Continued)

(58) Field of Classification Search
CPC .... B60W 30/146; B60W 10/26; B60W 10/10; B60W 50/08; B60W 10/02;
(Continued)

(56) References Cited

U.S. PATENT DOCUMENTS

| | | | | |
|---|---|---|---|---|
| 8,768,584 B2* | 7/2014 | Dufford | ............... | B60W 20/00 477/120 |
| 2013/0103238 A1* | 4/2013 | Yu | ......................... | B60W 20/12 701/22 |

(Continued)

FOREIGN PATENT DOCUMENTS

| | | |
|---|---|---|
| JP | 2007-187090 A | 7/2007 |
| JP | 2009-190433 A | 8/2009 |

(Continued)

*Primary Examiner* — Frederick M Brushaber
(74) *Attorney, Agent, or Firm* — Mintz Levin Cohn Ferris Glovsky and Popeo, P.C.; Peter F. Corless

(57) ABSTRACT

An auto cruise control method for a hybrid electric vehicle is provided. The auto cruise control method maximizes an effect of enhancing fuel efficiency and simultaneously satisfies enhancement in driveability and fuel efficiency due to the application of a pulse and glide (PnG) pattern obtained by considering the characteristics of the hybrid electric vehicle (HEV). The method includes receiving a target vehicle speed by a driver input to turn on an auto cruise mode and to turn on a pulse and glide (PnG) mode in a hybrid electric vehicle using an engine and a driving motor as vehicle driving sources. One PnG mode among a PnG coast mode, a PnG glide mode, and a PnG cruise control mode are selected from a map based on the target vehicle speed and driving control of the selected PnG mode is then performed.

19 Claims, 7 Drawing Sheets

(51) Int. Cl.

| | |
|---|---|
| *B60W 10/10* | (2012.01) |
| *B60W 50/08* | (2020.01) |
| *B60W 10/02* | (2006.01) |
| *B60W 40/105* | (2012.01) |
| *B60W 20/40* | (2016.01) |
| *B60W 10/11* | (2012.01) |
| *B60W 20/10* | (2016.01) |
| *B60W 20/00* | (2016.01) |
| *B60W 10/06* | (2006.01) |
| *B60W 30/182* | (2020.01) |
| *B60L 15/20* | (2006.01) |
| *B60W 20/15* | (2016.01) |
| *B60W 10/08* | (2006.01) |
| *B60W 30/18* | (2012.01) |
| *B60W 10/04* | (2006.01) |

(52) U.S. Cl.
CPC ............ *B60W 10/02* (2013.01); *B60W 10/04* (2013.01); *B60W 10/06* (2013.01); *B60W 10/08* (2013.01); *B60W 10/10* (2013.01); *B60W 10/11* (2013.01); *B60W 10/26* (2013.01); *B60W 20/00* (2013.01); *B60W 20/10* (2013.01); *B60W 20/15* (2016.01); *B60W 20/40* (2013.01); *B60W 30/14* (2013.01); *B60W 30/18* (2013.01); *B60W 30/182* (2013.01); *B60W 40/105* (2013.01); *B60W 50/08* (2013.01); *B60W 50/082* (2013.01); *B60L 2240/12* (2013.01); *B60L 2250/26* (2013.01); *B60L 2260/24* (2013.01); *B60L 2260/26* (2013.01); *B60W 2510/083* (2013.01); *B60W 2520/105* (2013.01); *B60W 2540/215* (2020.02); *B60W 2710/021* (2013.01); *B60W 2710/06* (2013.01); *B60W 2710/083* (2013.01); *B60W 2710/10* (2013.01); *B60W 2720/103* (2013.01); *B60W 2720/106* (2013.01); *Y02T 10/645* (2013.01); *Y02T 10/72* (2013.01); *Y02T 10/7283* (2013.01); *Y10S 903/93* (2013.01)

(58) Field of Classification Search
CPC .... B60W 40/105; B60W 20/40; B60W 10/11; B60W 30/14; B60W 20/10; B60W 30/18; B60W 20/00; B60W 10/08; B60W 10/06; B60W 50/082; B60W 30/182; B60W 10/04; B60W 20/15; B60W 2710/10; B60W 2710/083; B60W 2710/06; B60W 2710/021; B60W 2520/105; B60W 2510/083; B60W 30/18072; B60W 2510/244; B60W 30/143; B60W 2520/10; B60W 2530/145; B60W 2540/215; B60W 2720/106; B60W 2720/103; B60L 15/2045; B60L 15/20; B60L 2260/26; B60L 2260/24; B60L 2250/28; B60L 2250/26; B60L 2240/12; Y02T 10/72; Y02T 10/645; Y02T 10/7283; Y10S 903/93

See application file for complete search history.

(56) References Cited

U.S. PATENT DOCUMENTS

| | | | |
|---|---|---|---|
| 2013/0158838 A1* | 6/2013 | Yorke | B60W 30/18018 |
| | | | 701/103 |
| 2013/0226420 A1* | 8/2013 | Pedlar | B60K 31/047 |
| | | | 701/67 |
| 2015/0039203 A1 | 2/2015 | Pedlar et al. | |
| 2016/0214606 A1* | 7/2016 | Roos | B60W 10/10 |
| 2018/0065620 A1* | 3/2018 | Eo | B60W 20/15 |
| 2018/0134296 A1* | 5/2018 | Oh | B60W 30/143 |
| 2018/0162397 A1* | 6/2018 | Eo | B60W 10/26 |

FOREIGN PATENT DOCUMENTS

| | | |
|---|---|---|
| JP | 2011-043141 A | 3/2011 |
| JP | 2013-086755 A | 5/2013 |
| JP | 5387778 B2 | 1/2014 |
| JP | 5696791 B2 | 4/2015 |
| JP | 5700120 B2 | 4/2015 |
| JP | 2016-130105 A | 7/2016 |
| KR | 10-1510048 B1 | 4/2015 |

* cited by examiner

●: OPERATING POINT DURING GENERAL CRUISE DRIVING

[ EXAMPLE OF MAP ]

AUTO CRUISE CONTROL METHOD AND SYSTEM FOR HYBRID ELECTRIC VEHICLE

CROSS-REFERENCE TO RELATED APPLICATION

This application claims under 35 U.S.C. § 119(a) the benefit of priority to Korean Patent Application No. 10-2016-0166463 filed on Dec. 8, 2016, the entire contents of which are incorporated herein by reference.

BACKGROUND

(a) Technical Field

The present disclosure relates to an auto cruise control method and system for a hybrid electric vehicle, and more particularly, to an auto cruise control method and system for a hybrid electric vehicle that apply a pulse and glide (PnG) pattern obtained by considering the characteristics of a hybrid electric vehicle (HEV) to maximize an effect of enhancing fuel efficiency and to simultaneously satisfy enhancement in driveability and fuel efficiency.

(b) Background Art

In general, an auto-cruise control apparatus of a vehicle is an apparatus for enabling automatic driving of a vehicle at set vehicle speed without driver manipulation of an accelerator pedal and is also referred to as a cruise control system. The auto-cruise control apparatus adjusts vehicle speed to target vehicle speed set by a driver when the target vehicle speed is set via driver manipulation to reduce the number of times of driver manipulation of an accelerator pedal, enhancing driving convenience.

With regard to a general auto-cruise control apparatus, when demand torque (cruise torque) for maintaining target vehicle speed is determined, for an internal combustion engine (engine) vehicle such as a gasoline vehicle or a diesel vehicle, the auto-cruise control apparatus adjusts engine driving to output demand torque via cooperative control between controllers to perform auto cruise driving for maintaining the target vehicle speed For an electrical vehicle driven using a motor, an auto-cruise control apparatus adjusts motor torque based on demand torque for maintaining the target vehicle speed and, for a hybrid electric vehicle (HEV) driven using a motor and an engine, the auto-cruise control apparatus distributes power to a motor and an engine to output demand torque. During cruise control driving of an internal combustion vehicle, an engine operating point is determined based on vehicle speed and transmission irrespective of an engine optimal operating line (OOL), as shown in FIG. 1.

Accordingly, auto cruise control driving of an internal combustion vehicle is disadvantageous in terms of fuel efficiency and cruise control technology for enhancing fuel efficiency has been researched. For example, utility of a pulse and glide (PnG) driving pattern for enhancing real-world fuel efficiency while repeated accelerating and decelerating of a vehicle during cruise driving has been multilaterally proved. FIG. 2 illustrates an example of a general PnG cruse driving state. PnG driving refers to a driving pattern in which a vehicle is driven at a point with excellent engine efficiency by moving an engine operating point to an OOL while maintaining average target vehicle speed and increasing vehicle speed in a pulse phase and coasting is performed in a glide phase to reduce entire fuel consumption as compared to conventional cruise control.

Referring to FIG. 2, a vehicle is accelerated to greater speed than vehicle cruise speed set by a driver in a pulse phase and, is decelerated via coasting in a fuel cut or engine complete stop state in a glide phase. The pulse phase and glide phase are periodically alternated and repeated while the vehicle is being driven. However, a variable amount (which is related to driveability) of vehicle speed and fuel efficiency have a tradeoff relation in terms of the application of conventional PnG cruise control and, thus, there is a need for an optimal control technology for simultaneously satisfying enhancement in driveability and fuel efficiency.

SUMMARY

The present invention provides an auto cruise control method for a hybrid electric vehicle, for applying a pulse and glide (PnG) pattern obtained by considering the characteristics of a hybrid electric vehicle (HEV) to maximize an effect of enhancing fuel efficiency. In another aspect, the present invention provides an auto cruise control method for a hybrid electric vehicle, for simultaneously satisfying enhancement in driveability and fuel efficiency.

In an exemplary embodiment, an auto cruise control method for a hybrid electric vehicle may include setting target vehicle speed by a driver to turn on an auto cruise mode and to turn on a pulse and glide (PnG) mode in a hybrid electric vehicle using an engine and a driving motor as vehicle driving sources, selecting one PnG mode among a PnG coast mode, a PnG glide mode, and a PnG cruise control mode from a map based on the target vehicle speed set by the driver, by a controller, and performing driving control of the selected PnG mode, by the controller.

The PnG coast mode is a mode in which vehicle acceleration (pulse phase) and deceleration (coast phase) are alternately repeated between set upper and lower target vehicle speed limits and coasting is performed by vehicle inertia during deceleration. The PnG glide mode is a mode in which vehicle acceleration (pulse phase) and deceleration (glide phase) are alternately repeated between the set upper and lower target vehicle speed limits and deceleration driving that follows a determined speed profile based on torque assist of a driving motor and vehicle inertia during deceleration is performed. Additionally, the PnG cruise control mode is a cruise driving mode for maintaining the target vehicle speed set by the driver using the vehicle driving sources.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
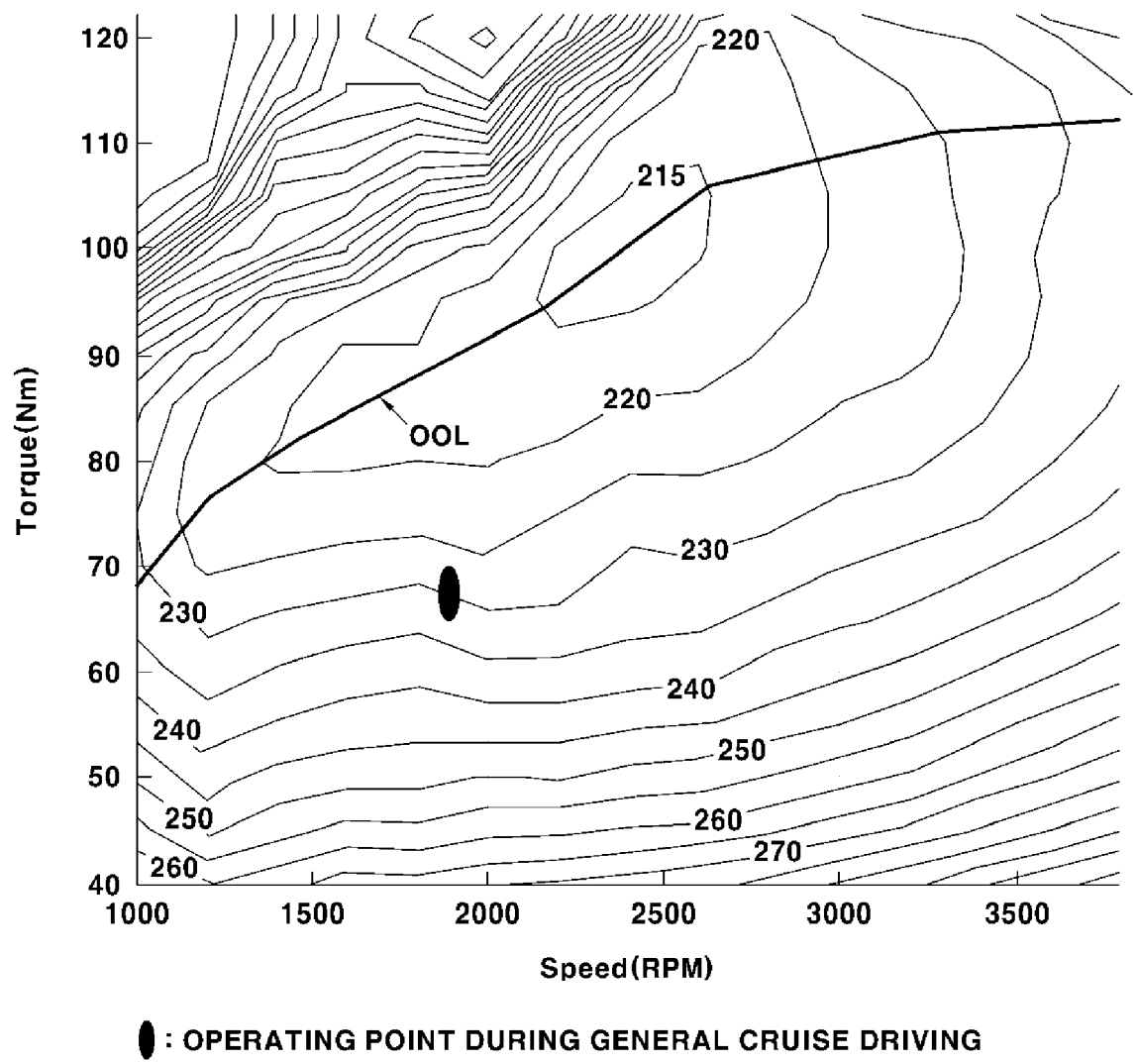
FIG. 1 is a diagram showing an operating point of an engine during auto cruise driving of an internal combustion vehicle according to the related art.
Figure 2:
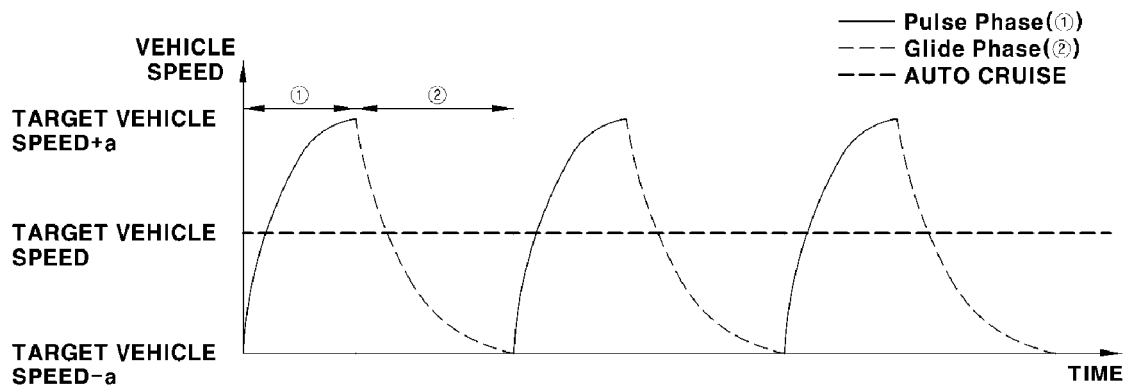
FIG. 2 illustrates an example of a general pulse and glide (PnG) cruse driving state according to the related art.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. It should be understood that the terms, such as 'including' or 'having,' etc., are intended to indicate the existence of the components disclosed in the specification, and are not intended to preclude the possibility that one or more other components may exist or may be added.

A control method and apparatus of the related art has been developed for embodying a pulse and glide (PnG) function by a general internal combustion vehicle, and more particularly, a technology of performing control to follow upper and lower target vehicle speed limits based on a reference vehicle speed during vehicle speed control and following a target speed by increasing and reducing a fuel level in a combustion chamber.

Another developed technique or the related art includes a method and apparatus for minimizing a variation in vehicle speed and slightly PnG-controlling a throttle value to enhance fuel efficiency, and more particularly, a technology of applying pulsation with a short period to a throttle value without variation in vehicle speed and moving an engine operating point to an operating point with excellent efficiency on a BSFC map to enhance fuel efficiency.

Accordingly, the present invention relates to a method and apparatus for implementing a PnG function in a hybrid electric vehicle (HEV) using an internal combustion engine (engine) and a motor as driving sources and applies a PnG driving pattern obtained by considering the characteristics of the HEV to maximize an effect of enhancing fuel efficiency.

In general, an HEV is operated at an OOL as an optimal operating point according to complex power optimization strategy of an engine and a motor and this operating strategy reduces efficiency by charge/discharge in an electric dynamometer. Accordingly, when an engine operating point is determined at an OOL as an optimal operating point while simultaneously minimizing use of an electric dynamometer, an effect of enhancing fuel efficiency may be obtained. According to the present invention, vehicle acceleration (e.g., pulse phase (OOL-oriented driving)) and deceleration control (e.g., coast phase or glide phase (fuel cut or powered deceleration)) may be performed while maintaining average target vehicle speed during auto cruise driving of an HEV to enhance real-world fuel efficiency.

As described above, during PnG driving in which vehicle acceleration and deceleration are periodically alternated and repeated, adjustments may be executed to follow upper and lower target vehicle speed limits and performed to reach and maintain upper and lower target vehicle speed limits via variation in demand torque, and torque distribution control may be performed on an engine and a motor to perform torque output that satisfies demand torque required to adjust vehicle speed during a pulse phase. During vehicle deceleration, coasting (coast phase) to be described later or a glide phase may be performed. The present invention may be applied to a transmission mounted electric drive/device (TMED)-type HEV in which a driving motor for vehicle driving mat be disposed at a transmission side. In a general TMED-type HEV, an engine and a driving motor as two driving sources for vehicle driving may be disposed in series, an engine clutch may be disposed between the engine and the driving motor, and a transmission may be disposed at an output side of the driving motor.

The engine clutch may selectively connect the engine and the motor to transmit power or may block the engine and the motor to prevent power transmission. When the engine clutch is closed, the engine and the driving motor may be connected to a drive shaft and a driving wheel to transmit power to the drive shaft and the driving wheel through the transmission. In other words, the engine clutch may be disposed to selectively connect or block power between the engine and the driving motor. As is well known, the engine clutch may be opened to drive a vehicle using only power of the driving motor during driving in an electric vehicle (EV) mode and closed to drive the vehicle using power of the engine and the driving motor during driving in an HEV mode.

During vehicle braking or driving by inertia, an energy regenerative mode in which the driving motor is operated as a generator to recharge a battery may be performed. A separate motor generator, i.e., a hybrid starter and generator (HSG) connected directly to the engine to transmit power to the engine may be installed in the engine and, thus, the HSG may be driven with battery power to transmit power to the engine when the engine is turned on and operated as a generator based on rotating force transmitted from the engine to recharge the battery.

A general HEV may include various controllers configured to operate respective devices in a vehicle. In other words, the HEV may include a hybrid control unit (HCU), an engine control unit (ECU) configured to operate the engine, a motor control unit (MCU) configured to operate the driving motor, a transmission control unit (TCU) configured to operate the transmission and the engine clutch, a battery management system (BMS) configured to operate and manage a battery, and may be configured to operate each device via cooperative control between controllers using the HCU as an uppermost controller. For example, according to a control command of the HCU, the TCU may be configured to adjust a clutch operating hydraulic pressure to close or open the engine clutch.

According to the present invention, such cooperative control between controllers may also be performed in a vehicle speed control procedure for each mode during auto cruise driving, and operations of the engine and the driving motor of the HCU, the transmission, and the engine clutch may be operated by the respective controllers. Although a plurality of controllers for operating the respective devices in the vehicle have been described above, an integrated controller may be used instead of the plurality of controllers and, in the specification, the controllers or the integrated controller will be collectively referred to as a controller.

Figure 3:
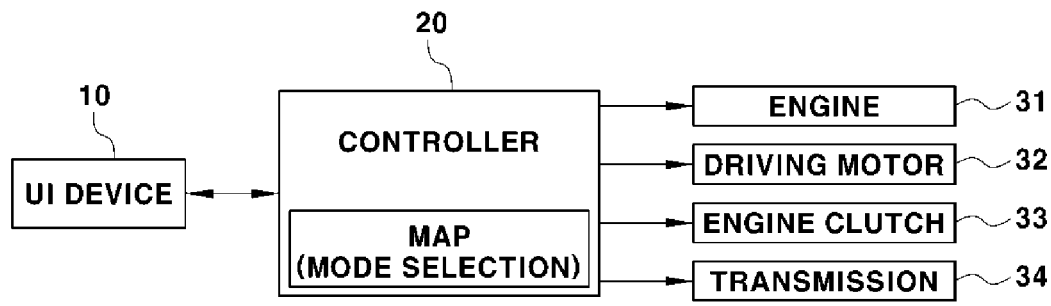
FIG. 3 is a block diagram illustrating a structure of a system for performing auto cruise control according to an exemplary embodiment of the present invention.

FIG. 3 is a block diagram illustrating a structure of a system for performing auto cruise control according to an exemplary embodiment of the present invention. According to the present invention, an auto cruise mode may include a PnG mode performed when a driver sets target vehicle speed, turns on the auto cruise mode and, then, turns on the PnG mode, and the PnG mode may include a plurality of driving modes. In other words, the PnG mode may include a plurality of subdivided driving modes, i.e., a PnG cruise control mode 'PnG_const', a PnG coast mode 'PnG_coast', and a PnG glide mode 'PnG_glide'.

In particular, the PnG coast mode 'PnG_coast' may be divided into a first PnG coast mode 'PnG_coast_ideal' as an ideal driving mode to which vehicle dynamic characteristics and transient states are not applied and considered, and a second PnG coast mode 'PnG_coast_real' as a real-world driving mode to which vehicle dynamic characteristics and transient state are applied and considered. The PnG mode may be defined as four modes of the PnG cruise control mode 'PnG_const', the first PnG coast mode 'PnG_coast_ideal', the second PnG coast mode 'PnG_coast_real', and the PnG glide mode 'PnG_glide'.

The first PnG coast mode is an ideal driving mode to which the vehicle dynamic characteristics and transient state are not applied and, thus, according to the present invention, the first PnG coast mode is not actually applied to the PnG mode and, hereinafter, the PnG coast mode 'PnG_coast' may refer to the second PnG coast mode 'PnG_coast_real'. In particular, according to the present invention, the PnG mode may include three modes, that is, the PnG cruise control mode 'PnG_const' in which cruise control is performed while target vehicle speed set by a driver is maintained, the PnG coast mode 'PnG_coast' in which vehicle acceleration (pulse phase) and deceleration (coast phase) are periodically alternated and repeated and transmission neutralization and engine clutch opening are performed and coasting (coasting according to vehicle inertia) in a fuel cut or engine complete stop state is performed during the deceleration phase (coast phase), and the PnG glide mode 'PnG_glide' in which vehicle acceleration (pulse phase) and deceleration (glide phase) are periodically alternated and repeated and deceleration is performed based on a speed profile set according to vehicle inertia and power of a driving motor during the deceleration phase (glide phase).

Figure 4:
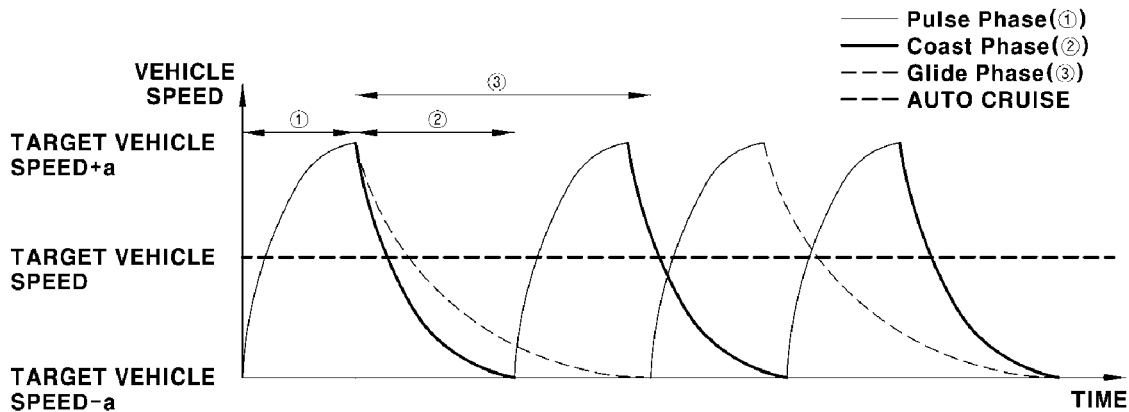
FIG. 4 is a diagram illustrating a cruise driving state for each PnG mode of a hybrid electric vehicle (HEV) according to an exemplary embodiment of the present invention.
Figure 5:
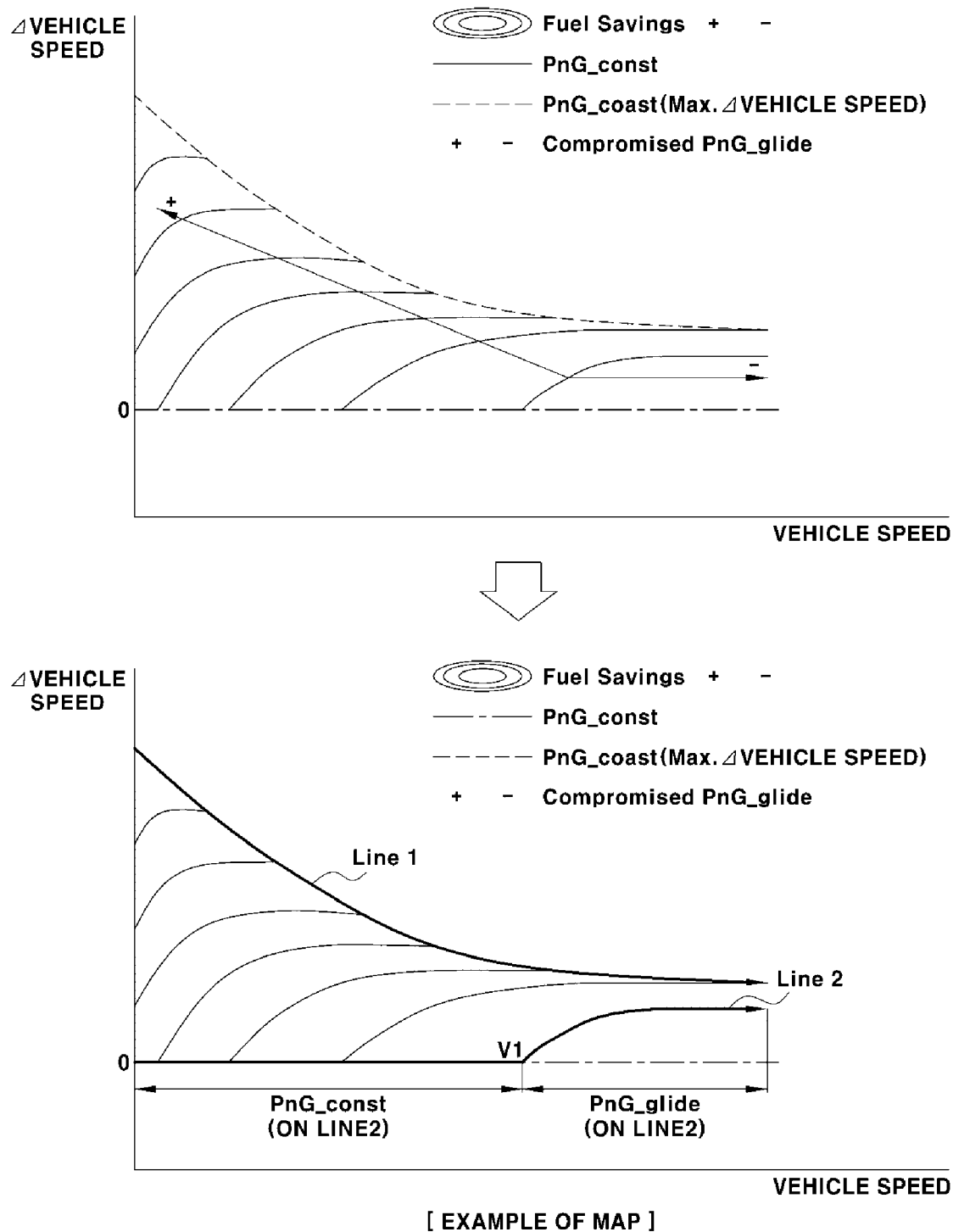
FIG. 5 is a diagram illustrating an example of a map for determining a PnG mode and vehicle speed variation amount (Δ vehicle speed) according to an exemplary embodiment of the present invention.

FIG. 4 is a diagram illustrating a cruise driving state for each PnG mode of an HEV according to an exemplary embodiment of the present invention. FIG. 5 is a diagram illustrating an example of a map for determining a PnG mode and vehicle speed variation amount (Δ vehicle speed) according to an exemplary embodiment of the present invention. Table 1 below shows a transmission state, an engine clutch state, and whether engine fuel cut is performed for each PnG mode.

The PnG coast mode 'PnG_coast' and the PnG glide mode 'PnG_glide' may each be a mode set with a driving pattern in which vehicle deceleration and acceleration are alternated and repeated and may not be different in terms of the acceleration phase (Pulse phase) control but may be different from the deceleration phase control compared with the PnG coast mode 'PnG_coast' and the PnG glide mode 'PnG_glide'. In particular, in the deceleration phase (coast phase) of the PnG coast mode 'PnG_coast', a vehicle driving source may not generate any power and a vehicle may be driven only by inertia to be decelerated.

Furthermore, in the deceleration phase (glide phase) of the PnG glide mode 'PnG_glide', torque assist may be performed to increase a driving distance during deceleration even when a minimal amount of energy in the vehicle is consumed unlike in the deceleration phase of the PnG coast mode. In particular, during deceleration in the PnG glide mode, power of the driving motor may be transmitted to the drive shaft and the driving wheel through a transmission to decelerate the vehicle with a lower deceleration inclination (i.e., reduced deceleration rate) than in deceleration in the PnG coast mode.

Particularly, during deceleration in the PnG glide mode 'PnG_glide', torque assist may be performed on the motor by demand torque for control of vehicle speed during deceleration to increase a driving distance unlike in deceleration in the PnG coast mode 'PnG_coast' in which a vehicle is driven only by inertia. Accordingly, driving force of the motor may be generated and output by an amount of motor torque assist to perform motor torque assist in which deceleration is performed while a vehicle is moved based on force obtained by adding driving force (i.e., torque assist force) of the motor to inertia of the vehicle and, in this case, the vehicle may be decelerated at a lower deceleration rate based on motor torque assist force exerted in a deceleration state than in deceleration of the PnG coast mode 'PnG_coast'.

Accordingly, in deceleration in the PnG glide mode, energy may be consumed in a vehicle but a driving distance may be advantageously increased and improved driveability may be advantageously achieved compared with deceleration in the PnG coast mode. Therefore, the PnG cruise control mode 'PnG_const' in which constant speed is maintained is the preferred in terms of driveability, and the PnG glide mode 'PnG_glide' in which a vehicle is relatively smoothly decelerated in a deceleration phase has improved driveability compared with the PnG coast mode 'PnG_coast' in which the vehicle is rapidly decelerated in the deceleration phase.

In terms of vehicle energy consumption, the PnG cruise control mode 'PnG_const' in which energy in a vehicle is continuously consumed to maintain constant speed is most disadvantageous and the PnG glide mode 'PnG_glide' in which energy in the vehicle is consumed in the deceleration phase is more disadvantageous than in the PnG coast mode 'PnG_coast' in which there is no energy consumption in the deceleration phase. Accordingly, in terms of fuel efficiency, the PnG coast mode 'PnG_coast' may be most advantageous and, next, the PnG glide mode 'PnG_glide' and the PnG cruise control mode 'PnG_const' may be advantageous in the order stated.

Hereinafter, according to the present invention, the deceleration phase of the PnG coast mode 'PnG_coast' will be classified as the 'coast phase' and the deceleration phase of the PnG glide mode 'PnG_glide' will be classified as the 'glide phase' (refer to FIG. 4). In Table 1 below, engine clutch states of the PnG coast mode 'PnG_coast' and the PnG glide mode 'PnG_glide' and whether fuel cut is performed are related to deceleration phases (coast phase and glide phase).

TABLE 1

| Division | Transmission | | Engine Clutch | Fuel Cut | Demand Torque |
|---|---|---|---|---|---|
| | Pulse phase | Coast/Glide phase | | | |
| PnG_coast | In Gear | Neutral | Open | o | Pulse phase: o<br>Coast phase: x |
| PnG_glide | In Gear | In Gear | Open | o | o (motor) |
| PnG_const | HEV In Gear | In Gear | Close | x | o (engine + motor) |
| | EV In Gear | In Gear | Open | o | o (motor) |

According to the present invention, a controller 20 may be configured to select any one among the above three modes, that is, the PnG cruise control mode 'PnG_const', the PnG coast mode 'PnG_coast', and the PnG glide mode 'PnG_glide' according to a map and, then, execute auto cruise driving in the selected mode and perform predetermined control on each device in the vehicle according to each mode. In other words, to perform any one of the PnG modes according to the map, the controller 20 may be configured to operate an engine 31, a driving motor 32, an engine clutch 33, a transmission 34, and so on, for example, fuel supply control (fuel cut, etc.) of the engine 31, control of closing or opening the engine clutch 33, neutral control of the transmission 34, and on the like.

A mode may be selected from the PnG modes according to the map while the auto cruise mode and the PnG mode may be selected to be turned on by a driver, as described above. In particular, the auto cruise mode may be turned on by setting target vehicle speed via driver manipulation of a user interface (UI) device 10 in a vehicle, such as a button or a switch (Cruise "Set") and may indicate a driver selection of auto cruise control, and the controller 20 may be configured to receive a signal based on the driver manipulation of the UI device 10 and recognize that an auto cruise function is turned on by the driver.

The PnG mode may also be turned on via driver manipulation of the UI device 10 in the vehicle, such as a button or a switch (PnG "On") and may indicate a driver selection of the PnG mode control, and the controller 20 may be configured to receive a signal based on the driver manipulation of the UI device 10 and recognize that a PnG function is turned on by the driver. Further, in a vehicle, the UI device 10 or manipulation thereof for turning the auto cruise function on/off is differentiated from the UI device 10 or manipulation thereof for turning the PnG function on/off.

According to the present invention, any one mode may be selected from a plurality of modes of the PnG mode based on a map that is pre-set, input, and stored a database in a memory of the controller 20, and the controller 20 may be configured to select and determine any one from a plurality of modes of the PnG mode from the map based on target vehicle speed set by a driver and fuel efficiency/driveability priority mode selection information to be described later. An example of the map is shown in FIG. 5 and, as seen from the map of FIG. 5, vehicle speed variation amount (Δ vehicle speed) may be set according to a value based on vehicle speed (e.g., target vehicle speed) for each mode of the PnG mode. The map may be set as described below (e.g., operating point analysis and optimal mode selection).

According to the present invention, the map for determining the PnG mode and vehicle speed variation amount (Δ vehicle speed) may be a map that determines vehicle speed variation amount using target vehicle speed as input and may be generated using a fuel efficiency measurement result of vehicle speed variation amount for each vehicle speed, obtained during preceding research, testing, and evaluation procedures, and a map value may be a set value of the vehicle speed variation amount indicating a maximum fuel efficiency effect for each vehicle speed.

First, driving fuel efficiency and demand power of the PnG cruise control mode 'PnG_const' for each vehicle speed may be measured. A fuel efficiency gain/loss rate for each vehicle speed variation amount (Δ vehicle speed) of the PnG coast mode 'PnG_coast' may then be measured based on demand power for each vehicle speed of the PnG cruise control mode 'PnG_const'. In particular, an inclination of demand torque for following vehicle speed variation amount (Δ vehicle speed) may be set to be a maximum inclination to be measured and speed change may be permitted. Further, a fuel efficiency gain/loss rate for each vehicle speed variation amount (Δ vehicle speed) in the PnG glide mode and for each motor torque assist amount in the deceleration phase (glide phase) or for deceleration inclination of the PnG glide mode 'PnG_glide' may be measured based on demand power for each vehicle speed of the PnG cruise control mode 'PnG_const'.

In particular, an inclination of demand torque for following vehicle speed variation amount (Δ vehicle speed) may be set to be a minimum inclination to be measured and speed change may not be permitted. The motor torque assist amount and the deceleration inclination will be re-described below. Accordingly, the controller 20 may be configured to select any one from a plurality of modes of the PnG mode using the map that is set as described above and determine the vehicle speed variation amount (Δ vehicle speed) based on the mode selected from the map.

When the PnG glide mode is selected, a motor torque assist amount or deceleration inclination that corresponds to target vehicle speed may be determined from a separate map, and while the vehicle is being driven in the PnG glide mode, control for driving in the PnG glide mode may be performed using the determined vehicle speed variation amount (Δ vehicle speed) and the motor torque assist amount or deceleration inclination in the deceleration phase. A gap of the measured fuel efficiency of the three modes may be reduced toward a period of high vehicle speed, an inversion phenomenon may occur in a predetermined period, and a measured fuel efficiency gain/loss rate for each mode may be stored as a map in a memory of the controller (refer to FIG. 5).

In FIG. 5, the X axis is vehicle speed (which is target vehicle speed) and the Y axis is the size of a vehicle speed variation amount (Δ vehicle speed). Toward a period of low vehicle speed, although an effect of enhancing fuel efficiency of the PnG coast mode 'PnG_coast' may be enhanced, a vehicle speed variation amount is disadvantageously increased in terms of driveability and, thus, a tradeoff relation may be seen.

Furthermore, FIG. 5 shows that an effect of enhancing fuel efficiency via PnG driving is reduced toward a period of high vehicle speed. In addition, a vehicle may include the UI device 10 configured to receive a driver selection of whether driveability or fuel efficiency is prioritized during selection of any one of the PnG modes and the UI device 10 may be connected to the controller 20. Accordingly, while a mode for performing PnG driving is subdivided into a plurality of modes, the driver may first select any one of the driveability priority mode in which driveability is prioritized and the fuel efficiency priority mode in which fuel efficiency is prioritized, using the UI device 10. When the driveability priority mode is selected, a mode with excellent driveability may be automatically selected from the map, and when the fuel efficiency priority mode is selected, a mode with excellent fuel efficiency may be automatically selected from the map.

As described above, among a plurality of modes of the PnG mode, the PnG cruise control mode 'PnG_const', the PnG glide mode 'PnG_glide', and the PnG coast mode 'PnG_coast' are improved in the order stated in terms of driveability and, thus, a map of a controller may be pre-manufactured to determine an order of mode selection in the driveability priority mode as the order of ① the PnG cruise control mode 'PnG_const', ② the PnG glide mode 'PnG_glide', and ③ the PnG coast mode 'PnG_coast'. In addition, among a plurality of modes of the PnG mode, the PnG coast mode 'PnG_coast', the PnG glide mode 'PnG_glide', and the PnG cruise control mode 'PnG_const' are improved in the order stated in terms of fuel efficiency of a vehicle and, thus, the map of the controller may be pre-manufactured to determine an order of mode selection in the fuel efficiency priority mode as the order of ① the PnG coast mode 'PnG_coast', ② the PnG glide mode 'PnG_glide', and ③ the PnG cruise control mode 'PnG_const'.

When one of the driveability priority mode and the fuel efficiency priority mode is selected using the UI device 10, the controller 20 may be configured to receive a mode selection signal from the UI device 10 and select any one among a plurality of modes of the PnG mode from the map using the driveability/fuel efficiency priority mode selection information and the target vehicle speed. The controller 20 may then be configured to perform cruise driving control of the vehicle in the selected mode.

For driveability priority mode selection, the controller 20 may be configured to select and determine a mode with optimal fuel efficiency among PnG modes obtained by considering a gain/loss rate for each mode and vehicle speed, from the map, perform driving with a vehicle speed variation amount (Δ vehicle speed) set to a minimum amount as described below and, simultaneously, minimize a sense of inconvenience of driveability via appropriate mode selection. For fuel efficiency priority mode selection, the controller 20 may be configured to select and determine a mode with optimal fuel efficiency among PnG modes obtained by considering a gain/loss rate for each mode and vehicle speed, from the map, perform driving with a vehicle speed variation amount (Δ vehicle speed) set to a maximum amount and, simultaneously, obtain highest fuel efficiency via appropriate mode selection.

As described below, the vehicle speed variation amount (Δ vehicle speed) may be used to determine upper and lower target vehicle speed limits and may be a value preset based on target vehicle speed as shown in the map of FIG. 5. Accordingly, the controller 20 may be configured to select a mode from the map and, simultaneously, determine a vehicle speed variation amount (Δ vehicle speed) that corresponds to the target vehicle speed set by the driver from the map of FIG. 5 and determine upper and lower target vehicle speed limits from the vehicle speed variation amount.

According to the present invention, the UI device 10 for driver selection of the driveability priority mode and the fuel efficiency priority mode may be a component that includes a display unit or other display devices of a cluster installed within a vehicle and an input unit for driver manipulation. The display unit or display devices of the cluster may indicate display information for enabling the driver to input selection and setting information of any one of the driveability priority mode and the fuel efficiency priority mode. Additionally, the input unit may be a manipulation device such as a button and a switch for enabling the driver to input mode selection and setting information via manipulation (e.g., a UI). The input unit, however, is not limited to a button and a switch but may be any type of known input device.

For example, when the display unit or display device of the cluster is a touchscreen-type device configured to detect a user touch, a separate input unit may be omitted. The UI device 10 or manipulation thereof for enabling the driver to select any one from the driveability priority mode and the fuel efficiency priority mode may be differentiated from the UI device 10 or manipulation thereof for turning on/off the auto cruise function and the UI device 10 or manipulation thereof for turning the PnG function on/off. When the PnG mode is off while the auto cruise mode is turned on, that is, when the PnG mode is turned off, a general cruise mode of a known HEV, that is, general cruise driving control of the vehicle for maintaining target vehicle speed set by the driver, may be performed. Among the PnG modes, the PnG cruise control mode is different from the general cruise mode in that the PnG cruise control mode is selected by the controller 20 when the PnG mode is turned on but is not different from the general cruise mode in terms of driving control in that cruise driving control of the vehicle is performed to continuously maintain the target vehicle speed set by the driver.

As shown in FIG. 4, when the controller 20 may be configured to select the PnG cruise control mode 'PnG_const', cruise driving control for maintaining the vehicle speed set by the driver while auto cruise is turned on, that is, target vehicle speed may be performed. In the PnG cruise control mode, power of the driving motor 32 may be used (in the case of EV mode) or complex power of the engine 31 and the driving motor 32 may be used (in the case of HEV mode) as in the case of driving in the general cruise mode. In other words, when the controller 20 selects the PnG cruise control mode, cruise driving may be performed in the HEV mode or EV mode determined based on a driving condition in an in-gear state of a transmission as for general cruise driving, and the engine clutch 33 may be closed when the vehicle is driven in the HEV mode and opened when the vehicle is being driven in the EV mode.

Further, engine power is not used in the EV mode and, thus, the engine 31 may be in a fuel cut or engine complete stop state. In the PnG cruise control mode, an OOL driving strategy may be maintained and an operating point may be determined on the OOL based on an HEV driving strategy. In particular, torque distribution control may be performed on the engine 31 and the driving motor 32 to achieve torque output that satisfies demand torque.

When a vehicle is driven in the PnG cruise control mode, as in the general HEV/EV mode, the engine clutch 33 may be closed in the HEV mode and may be opened in the EV mode. The PnG cruise control mode is an improved mode (e.g., excellent, sufficient, desirable mode etc.) in terms of driveability since constant speed may be maintained as target vehicle speed while the vehicle is being driven. Additionally, power transmission efficiency may be determined based on power distribution of the engine 31 and a motor and power used in charge/discharge may cause reduction in efficiency.

Since the engine 31 and the driving motor 32 need to continuously output power to satisfy demand torque for maintaining constant speed, fuel and electric energy need to be continuously used and use of fuel and energy is increased in proportion to a vehicle mileage and, thus, the mode is disadvantageous in terms of fuel efficiency. When the controller 20 selects the PnG coast mode 'PnG_coast', vehicle speed variation amount (Δ vehicle speed) that corresponds to target vehicle speed set by a driver via the controller 20 may be determined from the map (refer to FIG. 5) and, then, the controller 20 may be configured to determine an upper target vehicle speed limit ('vehicle speed+a') and a lower target vehicle speed limit ('vehicle speed−a') to which the determined vehicle speed variation amount (Δ vehicle speed=a in the example of FIG. 4) is applied, based on the target vehicle speed.

When the upper target vehicle speed limit and the lower target vehicle speed limit are determined in the PnG coast mode, driving control for following the upper and lower target vehicle speed limits may be performed. In particular, driving of one or more of the engine 31 and the driving motor 32 may be executed to accelerate a vehicle to the upper target vehicle speed limit ('vehicle speed+a') in the acceleration phase (pulse phase). Additionally, demand power and demand torque for vehicle acceleration are increased. The demand torque may be determined to increase vehicle speed based on a speed increase inclination set by the controller 20 and output of one or more of the engine 31 and the driving motor 32 may be adjusted to satisfy the determined demand torque.

Particularly, the speed increase inclination may be a value predetermined by the controller 20 and alternatively, may be set by a driver through the UI device 10. In the acceleration phase, the transmission 34 may be operated to be in an in-gear state, the engine clutch 33 may be operated to be closed when power of an engine is used to satisfy the demand torque, and the engine clutch 33 may be operated to be opened and in a fuel cut or engine complete stop state when power of the engine is not used. In the deceleration phase (coast phase), deceleration control for driving a vehicle using only inertia may be performed until the lower target vehicle speed limit ('vehicle speed−a') is reached while the engine 31 and the driving motor 32 are stopped and, in this case, operation of a transmission neutral state, an engine clutch open state, and a fuel cut or engine complete stop state may be performed, as shown in Table 1 above.

The transmission 34 may be configured to maintain an in-gear state that is not a neutral state and, in this case, it may be possible to recover energy by the driving motor 32. Then, the PnG glide mode 'PnG_glide' is different from the PnG coast mode 'PnG_coast' in that vehicle deceleration control that restrictedly uses electrical energy, i.e., motor power in the deceleration phase (glide phase) is performed but is not different from the PnG coast mode 'PnG_coast' in terms of control in the acceleration phase (pulse phase) and, thus, a detailed description of the acceleration phase in PnG glide mode 'PnG_glide' will be omitted here.

In the deceleration phase (glide phase) of the PnG glide mode 'PnG_glide', vehicle deceleration, in which motor torque is generated to have a lower deceleration inclination than in the deceleration phase (coast phase) of the PnG coast mode 'PnG_coast,' may be performed and, in this case, a vehicle mileage in the deceleration phase may be increased compared with deceleration in the PnG coast mode. In other words, in the deceleration phase, torque assist control for generating force for moving a vehicle in addition to vehicle inertia may be performed by a driving motor, and vehicle deceleration with a speed profile of a lower deceleration inclination than deceleration in the PnG coast mode in which vehicle deceleration is performed using only inertia via torque assist control may be performed.

Even when the PnG glide mode 'PnG_glide' is selected, the controller 20 may be configured to set vehicle speed variation amount (Δ vehicle speed) from the map and determine deceleration setting information for determining a speed profile in the deceleration phase, i.e., the motor torque assist amount or the deceleration inclination in addition to the vehicle speed variation amount, from a separate map. Accordingly, the controller 20 may be configured to determine the motor torque assist amount or the deceleration inclination from a separate map and, in this case, a map may be generated and stored in the memory of the controller 20 to determine the motor torque assist amount or the deceleration inclination from the target vehicle speed.

Accordingly, the upper and lower target vehicle speed limits to which the vehicle speed variation amount (Δ vehicle speed=a in the example of FIG. 4) set by a driver based on the target vehicle speed is applied may be determined, vehicle acceleration may be performed up to the upper target vehicle speed limit ('vehicle speed+a') in the acceleration phase (pulse phase) and, then, torque assist may be performed by a motor based on the motor torque assist amount or deceleration inclination determined from the map while a vehicle is decelerated up to the lower target vehicle speed limit ('vehicle speed−a') in the deceleration phase (glide phase). The aforementioned torque assist in the deceleration phase, i.e., the glide phase indicates using motor power to perform vehicle deceleration with a speed profile having a lower deceleration inclination than the coast phase in which vehicle deceleration is performed using only inertia, but not vehicle acceleration by torque assist.

Referring to Table 1 above, in the deceleration phase (glide phase) of the PnG glide mode 'PnG_glide', the transmission 34 may be operated to be in an in-gear state, the engine clutch 33 may be operated to be opened, and the engine 31 may be maintained in a fuel cut or engine complete stop state. Accordingly, in the deceleration phase of the PnG glide mode, motor power may be used restrictedly but, as necessary, the engine clutch 33 may be closed to perform engine braking to adjust vehicle speed based on a speed profile and, as necessary, it may be possible to use engine torque while the engine clutch is closed. The vehicle speed adjustment in which deceleration is performed at a low inclination restrictedly using electrical power, i.e., motor power in the deceleration phase of the PnG glide mode may not be limited to when only motor power is used to adjust the vehicle speed and may include adjustment using engine braking or engine torque.

In the example of FIG. 4, 'vehicle speed+a' indicates the upper target vehicle speed limit and the 'vehicle speed−a' indicates the lower target vehicle speed limit. In the example of FIG. 4, the upper target vehicle speed limit and the lower target vehicle speed limit in the PnG coast mode 'PnG_coast' and the PnG glide mode 'PnG_glide' have the same value but, in an example to which the map of FIG. 5 is applied, a vehicle speed variation amount obtained from the map based on target vehicle speed is different in the two modes 'PnG_Coast and PnG_glide' and, thus, the upper target vehicle speed limit and the lower target vehicle speed limit in the two modes may actually have different values.

In the example of FIG. 4, a vehicle may be driven in speed states of (and (during driving in the PnG coast mode 'PnG_coast' and driven in speed states of (and @during driving in the PnG glide mode 'PnG_glide'. In the example to which the map of FIG. 5 is applied, the 'Line 1' is a line for a fuel efficiency priority mode in which vehicle speed variation amount (Δ vehicle speed) is set based on target vehicle speed and the 'Line 2' is a line for an driveability priority mode in which vehicle speed variation amount (Δ vehicle speed) is set based on target vehicle speed.

Particularly, the 'Line 1' is a line that follows a maximum value of the vehicle speed variation amount and indicates vehicle speed variation amount (Δ vehicle speed) based on target vehicle speed while the vehicle is being driven in the PnG coast mode. The 'Line 2' is a line that follows 0 that is a minimum value of the vehicle speed variation amount in a low speed condition in which the target vehicle speed is equal to or less than preset reference vehicle speed V1 and, then, maintains a specific vehicle speed variation amount (Δ vehicle speed) between the maximum value and the minimum value (0) in a high speed condition in which the target vehicle speed is greater than V1. As in the example of FIG. 5, in the map, vehicle speed variation amount (Δ vehicle speed) of the PnG coast mode 'PnG_coast' may be set to be greater than vehicle speed variation amount (Δ vehicle speed) of the PnG glide mode 'PnG_glide' in all periods of the target vehicle speed, and for the PnG cruise control mode 'PnG_const', the vehicle speed variation amount (Δ vehicle speed) may be set to a minimum value, i.e., 0.

Moreover, the controller 20 may be configured to determine vehicle speed variation amount (Δ vehicle speed) that corresponds to target vehicle speed currently set by a driver using the map of FIG. 5 to determine the corresponding vehicle speed variation amount (Δ vehicle speed) using target vehicle speed as input. Accordingly, when the fuel efficiency priority mode is selected by the driver, a maximum value of vehicle speed variation amount (Δ vehicle speed) that corresponds to the set target vehicle speed may be determined from the map of FIG. 5 and the PnG coast mode 'PnG_coast' for obtaining a maximum fuel efficiency effect may be selected as the PnG mode. In other words, a maximum value (e.g., selected from values that follow Line 1) may be determined as the vehicle speed variation amount from the vehicle speed variation amount (Δ vehicle speed) that corresponds to the current target vehicle speed, and when the upper and lower target vehicle speed limits are determined from the determined vehicle speed variation amount (Δ vehicle speed), driving in the PnG coast mode may be performed using the determined upper and lower target vehicle speed limits.

When the driveability priority mode is selected by the driver, the vehicle speed variation amount (Δ vehicle speed) that corresponds to the target vehicle speed may be determined among values that follow Line 2 and, in this regard, in a condition in which the target vehicle speed is equal to or less than V1, the vehicle speed variation amount (Δ vehicle speed) may be determined as 0 as a minimum value, the PnG cruise control mode 'PnG_const' may be selected, and driving in the PnG cruise control mode may be performed. While the driveability priority mode is selected, when the vehicle is driven in the PnG cruise control mode and the target vehicle speed is greater than V1, vehicle fuel efficiency is degraded and, thus, the PnG glide mode 'PnG_glide' may be selected to satisfy driver intention for enhancing fuel efficiency, and the vehicle speed variation amount (Δ vehicle speed) that corresponds to the currently set target vehicle speed may be determined among values (e.g., a right portion of Line 2, in which the target vehicle speed is greater than V1 in FIG. 5) that follow Line 2.

Accordingly, when the vehicle speed variation amount (Δ vehicle speed) is determined, the upper and lower target vehicle speed limits may be determined from the determined vehicle speed variation amount, and the vehicle may be driven in the PnG glide mode using the determined upper and lower target vehicle speed limits. In particular, when the driveability priority mode is selected by the driver, the PnG cruise control mode 'PnG_const' or the PnG glide mode 'PnG_glide' may be determined from the map of FIG. 5 and the vehicle may be driven in the corresponding mode. When the fuel efficiency priority mode is selected, the PnG coast mode 'PnG_coast' may be determined from the map of FIG. 5 and the vehicle may be driven in the PnG coast mode. Accordingly, PnG driving in the mode selected from the map by the controller 20 may be automatically performed and, in particular, when the PnG glide mode is selected, optimal auto cruise control may be performed in consideration of both fuel efficiency and driveability.

Figure 6:
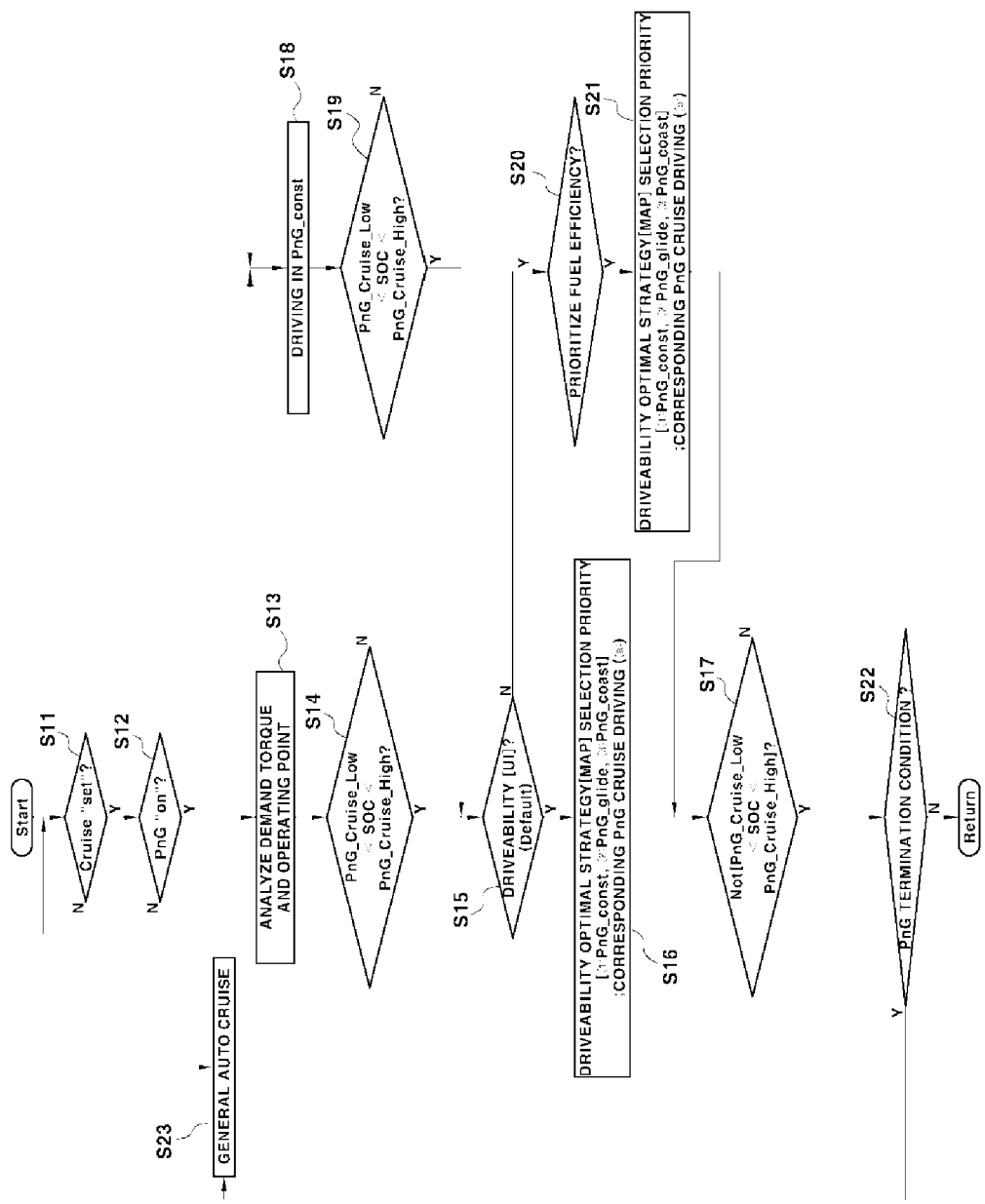
FIGS. 6 to 8 are flowcharts illustrating an auto cruise control method according to an exemplary embodiment of the present invention.
Figure 7:
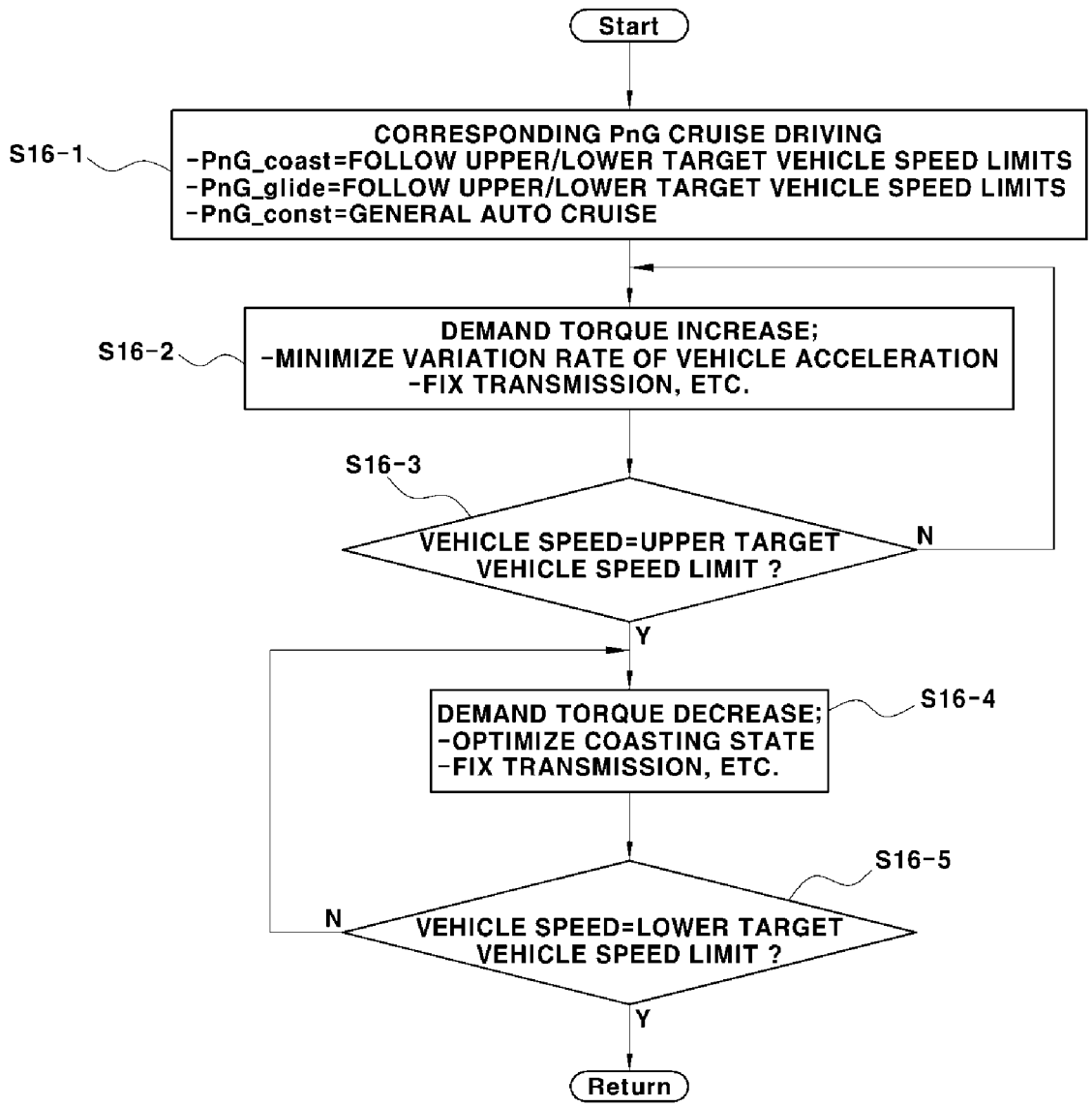
Figure 8:
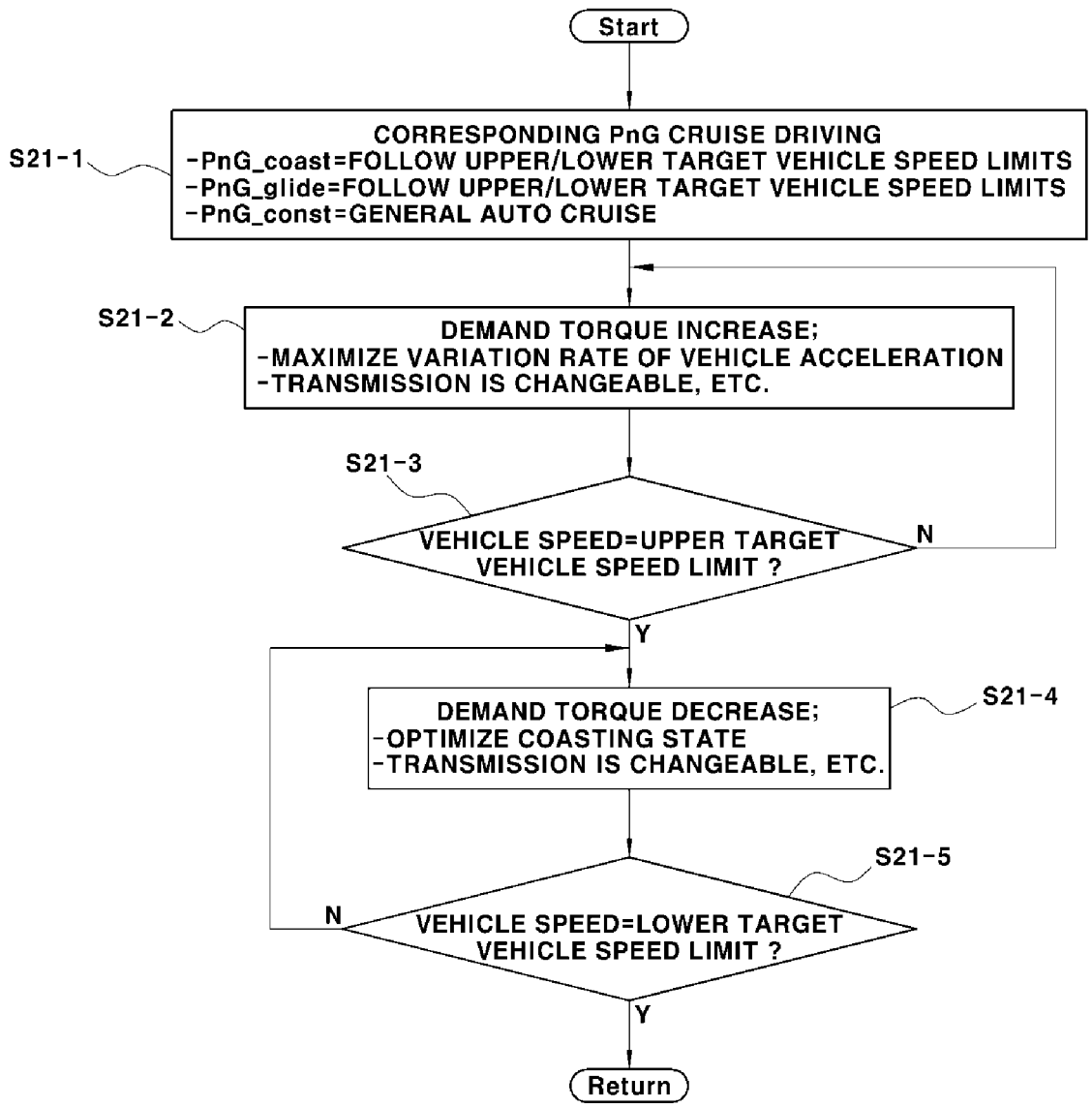

FIGS. 6 to 8 are flowcharts illustrating an auto cruise control method according to an exemplary embodiment of the present invention. Referring to FIG. 6, a driver may set target vehicle speed, turn on an auto cruise mode (cruise "set") (S11), and turn on a PnG mode (S12). When the auto cruise mode is turned on and the PnG mode is off, a constant vehicle speed may be maintained in a general cruise mode by the controller 20 (S23). The controller may be configured to receive a signal indicating the target vehicle speed, whether the auto cruise mode is set, and whether the PnG mode is turned on.

Further, when the PnG mode is turned on, the controller 20 may be configured to analyze demand torque and an operating point (S13) and detect and monitor a general driving state, i.e., a value of vehicle speed or accelerator position sensor (APS), driver demand torque, an EV/HEV driving state, and so on. The controller 20 may then be configured to determine whether a current battery state of charge (SoC) (BMS information) is within a preset range (S14). In other words, when the battery SoC is equal to or greater than a preset upper limit (PnG_Cruise_High) and equal to or less than a lower limit (PnG_Cruise_Low) and the battery SoC is out of the range, the vehicle may be operated to be driven in the PnG cruise control mode 'PnG_const' (S18).

In operation S14 or operation S19 during driving in the PnG cruise control mode 'PnG_const', when the battery SoC is determined to be within the preset range (PnG_Cruise_Low≤SoC≤PnG_Cruise_High), the controller 20 may be configured to display a UI for selecting and inputting any one of the driveability priority mode and the fuel efficiency priority mode through the UI device 10 and provide the UI to the driver (e.g., output the UI on a display unit). When a mode desired by the user may be selected through the UI device 10 (S15 and S20), the controller 20 may be configured to select any one of the PnG cruise control mode 'PnG_const', the PnG coast mode 'PnG_coast', and the PnG glide mode 'PnG_glide' from the map and, then, the vehicle may be driven in the selected mode (S16 and S21).

Particularly, when the driveability priority mode is selected, the controller 20 may be configured to select one mode in which driveability is prioritized among the PnG cruise control mode 'PnG_const', the PnG coast mode 'PnG_coast', and the PnG glide mode 'PnG_glide' from the map and, then, the vehicle may be driven in the mode selected under control of the controller 20 (S15 and S16). When the example of FIG. 5 is applied, when the driveability priority mode is selected, the controller 20 may be configured to select any one of the PnG cruise control mode 'PnG_const' and the PnG glide mode 'PnG_glide' based on target vehicle speed from the map and, then, the vehicle may be driven in the mode selected under control of the controller 20.

In operation S16, when the PnG cruise control mode 'PnG_const' is selected from the map, the controller 20 may be configured to maintain vehicle speed at the target vehicle speed set by the driver. When the PnG coast mode 'PnG_coast' or the PnG glide mode 'PnG_glide' is selected from the map, the controller 20 may be configured to determine vehicle speed variation amount (Δ vehicle speed) from the map of FIG. 5 based on the target vehicle speed set by the driver and determine upper and lower target vehicle speed limits from the determined vehicle speed variation amount.

As shown in FIG. 7, demand torque may be increased until an upper target vehicle speed limit is reached based on a speed increase inclination set by the controller 20 and torque output that correspond to the demand torque from a vehicle driving source may be performed and, accordingly, vehicle acceleration in the pulse phase may be performed (S16-2 and S16-3). When the upper target vehicle speed limit is reached, the controller 20 may be configured to operate a vehicle by reducing the demand torque and executing vehicle deceleration for driving a vehicle using only inertia until the lower target vehicle speed limit is reached, that is, coasting or may be configured to operate the vehicle to perform glide driving (e.g., glide phase) in which vehicle deceleration is executed based on a speed profile with a low deceleration inclination using motor power until the lower target vehicle speed limit is reached (S16-4 and S16-5).

According to the present invention, an increase and a decrease in demand torque may refer to an increase and a decrease in vehicle speed. In this regard, in the pulse phase as the acceleration phase of the PnG coast mode 'PnG_Coast', demand torque and vehicle speed may be increased and, in the coasting (coast phase) as the deceleration phase of the PnG coast mode 'PnG_Coast', demand torque and vehicle speed may be decreased. In the deceleration phase of the PnG coast mode, deceleration in which the vehicle is driven using only inertia may be performed. In the pulse phase as the acceleration phase of the PnG glide mode 'PnG_Glide', demand torque and vehicle speed may be increased, and in the glide driving (glide phase) as the deceleration phase of the PnG glide mode 'PnG_Glide', demand torque and vehicle speed may be decreased.

During glide driving, torque assist may be performed by the driving motor based on deceleration setting information determined from the map during vehicle deceleration, i.e., motor torque assist amount or deceleration inclination. When vehicle speed reaches a lower target vehicle speed limit, vehicle acceleration and deceleration may be alternately repeated, and, when a battery state of charge (SOC) is within a preset upper limit (PnG_Cruise_High) and a lower limit (PnG_Cruise_Low) (PnG_Cruise_Low≤SoC≤PnG_Cruise_High) (S17), driving may be continuously maintained in a mode selected from the PnG cruise control mode, the PnG coast mode, and the PnG glide mode. In operation S17, when the battery SOC is out of the range between the upper limit (PnG_Cruise_High) and the lower limit (PnG_Cruise_Low), that is, when the battery SOC exceeds the upper limit or is less than the lower limit, the vehicle may be driven in the PnG cruise control mode 'PnG_Const' and, thereafter, when the battery SOC is within the range again, a current mode may be returned to the original mode.

When a PnG control termination condition set during driving in the selected mode is satisfied, the controller 20 may be configured to terminate control in the PnG mode (S22) and switch from the current control to general cruise mode control (S23). In particular, as the PnG control termination condition, the controller 20 may be configured to terminate control when the driver inputs PnG mode "Off" or the battery SOC is beyond the range between the upper limit and the lower limit, and when a preset general auto cruise release condition is satisfied, the auto cruise mode may be completely released.

Particularly, when margin values a and P to be respectively applied to the upper limit and the lower limit of the PnG control termination condition are set and the battery SOC exceeds a range to which the margin values are applied, that is, when 'SoC≤PnG_Cruise_Lo−α' or'PnG_Cruise_High+β≤SoC', control may be terminated. When the fuel efficiency priority mode is selected, the controller 20 may be configured to select one mode in which fuel efficiency is preferentially considered among the PnG cruise control mode 'PnG_const', the PnG coast mode 'PnG_coast', and the PnG glide mode 'PnG_glide' from the map and, then, the vehicle may be driven in the mode selected in the control of the controller 20 (S20 and S21).

When the map of FIG. 5 is applied, when the driveability priority mode is selected, the controller 20 may be configured to select the PnG coast mode 'PnG_coast' from the map and, then, the vehicle may be driven in the mode selected in control of the controller 20. When the PnG cruise control mode 'PnG_const' is selected from the map, the controller 20 may be configured to maintain vehicle speed to constant velocity as target vehicle speed set by the driver. Further, when the PnG coast mode 'PnG_coast' or the PnG glide mode 'PnG_glide' is selected from the map, the controller 20 may be configured to determine vehicle speed variation amount (Δ vehicle speed) from the map of FIG. 5 based on the target vehicle speed set by the driver and determine upper and lower target vehicle speed limits from the determined vehicle speed variation amount, as in the driveability priority mode.

Moreover, as illustrated in FIG. 8, demand torque may be increased until an upper target vehicle speed limit is reached based on a speed increase inclination set by the controller 20 and torque that corresponds to the demand torque from a vehicle driving source may be output and, accordingly, the vehicle may be accelerated in the pulse phase (S21-2 and S21-3). When the upper target vehicle speed limit is reached, the controller 20 may be configured to operate a vehicle by reducing the demand torque and decelerating the vehicle to drive a vehicle using only inertia until the lower target vehicle speed limit is reached, that is, coasting. Alternatively, the controller 20 may be configured to operate the vehicle to perform glide driving (glide phase) in which the vehicle is decelerated (e.g., the brake is operated) to a speed profile with a low deceleration inclination using motor power until the lower target vehicle speed limit is reached (S21-4 and S21-5).

In the pulse phase as the acceleration phase of the PnG coast mode 'PnG_Coast', demand torque and vehicle speed may be increased and, in the coasting (coast phase) as the deceleration phase of the PnG coast mode 'PnG_Coast', demand torque and vehicle speed may be decreased. In the deceleration phase of the PnG coast mode, deceleration in which driving is performed using only inertia may be performed. In the pulse phase as the acceleration phase of the PnG glide mode 'PnG_Glide', demand torque and vehicle speed may be increased, and in the glide driving (glide phase) as the deceleration phase of the PnG glide mode 'PnG_Glide', demand torque and vehicle speed may be decreased.

During glide driving, torque assist may be performed by the driving motor based on deceleration setting information determined from the map during vehicle deceleration, i.e., motor torque assist amount or deceleration inclination. When vehicle speed reaches a lower target vehicle speed limit, vehicle acceleration and deceleration may be alternately repeated, and even when a fuel efficiency priority mode is selected, when a battery SOC is within a preset upper limit (PnG_Cruise_High) and a lower limit (PnG_Cruise_Low) (PnG_Cruise_Low≤SoC≤PnG_Cruise_High) (S17), the vehicle may be continuously maintained in a mode selected from the PnG cruise control mode, the PnG coast mode, and the PnG glide mode.

In operation S17, when the battery SOC is out of the range between the upper limit (PnG_Cruise_High) and the lower limit (PnG_Cruise_Low), that is, when the battery SOC exceeds the upper limit or is less than the lower limit, the vehicle may be driven in the PnG cruise control mode 'PnG_Const'. When the battery SOC is within the range again, a current mode may be returned to the original mode. When a PnG control termination condition set while the vehicle is being driven in the selected mode is satisfied, the controller 20 may be configured to terminate control in the PnG mode (S22) and convert the current control to general cruise mode control (S23). The general cruise mode in operation S23 is a mode in which vehicle driving is operated to maintain the target vehicle speed set by the driver and is not different from the PnG cruise control mode in operation S18 in terms of vehicle control and driving states for maintaining vehicle speed.

Figure 9:
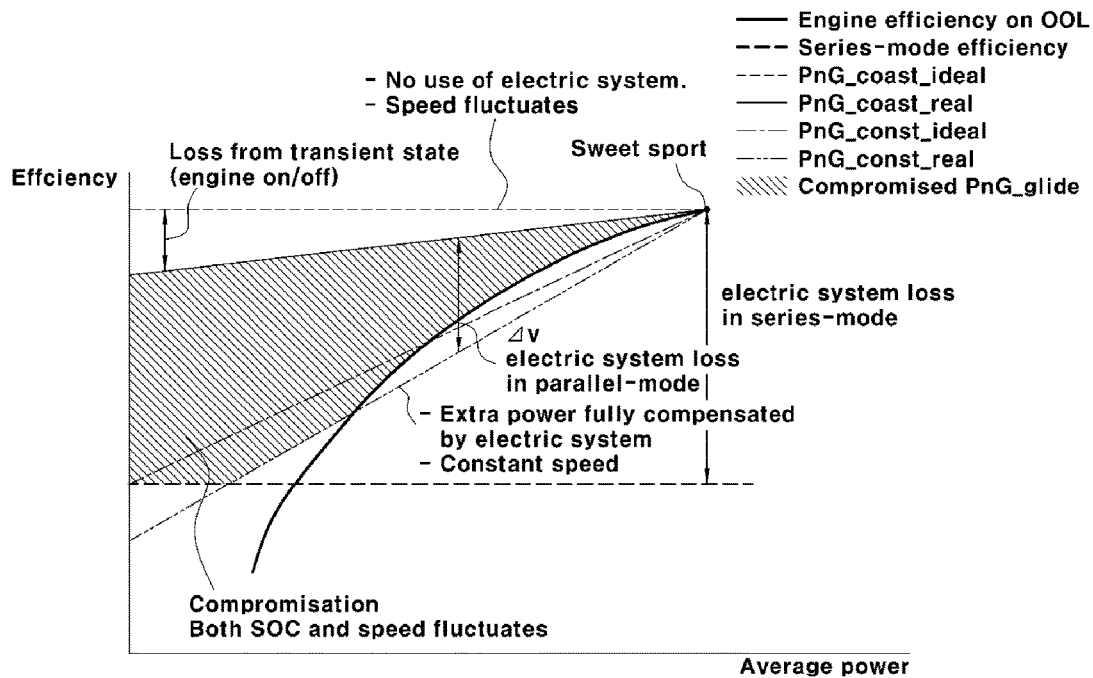
FIGS. 9 and 10 are diagrams for a comparison of PnG modes according to an exemplary embodiment of the present invention.

FIG. 9 is a diagram for a comparison of PnG modes and in FIG. 9, the X axis is power and the Y axis is efficiency. In an HEV, a maximum point of engine efficiency is a sweet spot (SS) and indicates an optimal operating point on a BSFC map. In the first PnG coast mode 'PnG_coast_ideal' as an ideal driving mode, an engine operating point in the acceleration phase (pulse phase) may be positioned at the sweet spot (SS) and the engine may be stopped in the deceleration phase (coast phase), and thus, the engine may operate at a theoretically optimal efficiency point. In particular, this is an ideal situation in which vehicle dynamic characteristics and transient state are not considered, and a variation range of vehicle speed is rapidly increased toward a low power period and, thus, driveability is adversely affected.

Further, the second PnG coast mode 'PnG_coast_real' mode as a real-world mode is a case in which there is a limit for following the SS based on a fixed gear ratio and vehicle dynamic characteristics and transient state are considered and, accordingly, efficiency may be degraded. In the PnG cruise control mode 'PnG_const mode, an operating point may be positioned on an OOL based on an HEV driving strategy and, in this case, power transmission efficiency may be determined based on power distribution of the engine 31 and the motor and power used in charge/discharge may cause reduction in efficiency. The PnG glide mode 'PnG_glide' may be a mode obtained via compromise between the PnG coast mode 'PnG_coast' and the PnG cruise control mode 'PnG_const' and the acceleration phase (pulse phase) may be the same as the PnG coast mode 'PnG_coast'.

However, in the deceleration phase (glide phase), control may be performed based on a strategy for partially generating assist torque (e.g., assist torque corresponding to demand torque) for maintaining maximum inertia of a vehicle using electrical power to extend a vehicle mileage. This may directly use a portion of electrical power energy stored via coasting in the PnG coast mode 'PnG_coast' to compensate for the disadvantage due to reduction in circulation efficiency of electrical power. Accordingly, vehicle speed may not be maintained in the PnG cruise control mode 'PnG_const' and deceleration may not be performed by the PnG coast mode 'PnG_coast'. As a result, both high efficiency as the advantage of the PnG coast mode and high driveability as the advantage of the PnG cruise control mode 'PnG_const' may be achieved via the compromise strategy.

Figure 10:
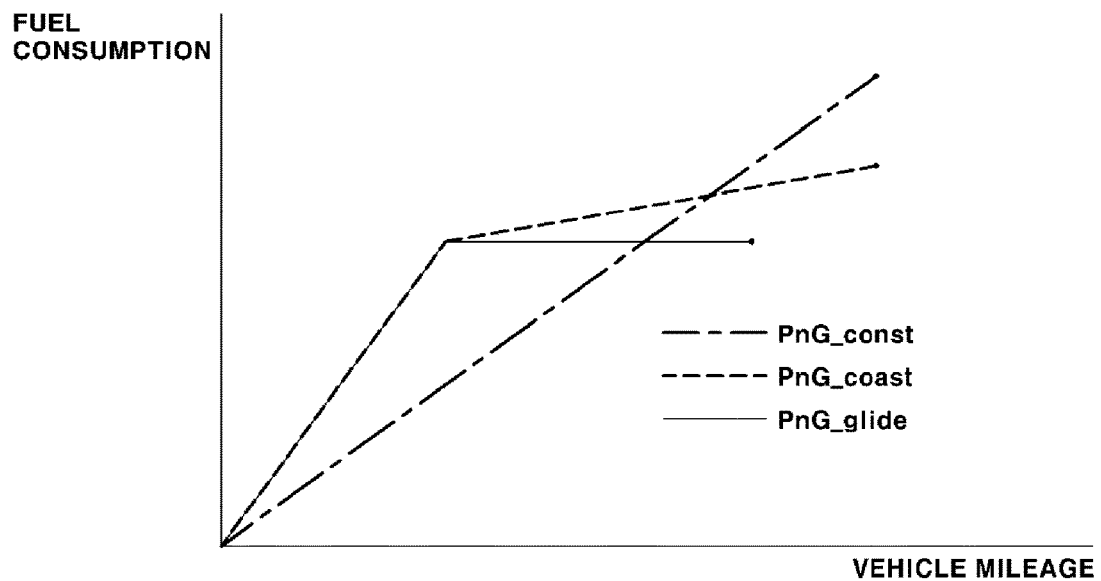

FIG. 10 is a diagram for a comparison of PnG modes and in FIG. 10, the X axis is a vehicle mileage and the Y axis is accumulative fuel consumption. A driving state in the PnG cruise control mode 'PnG_const' is a cruise driving state and, thus, fuel consumption is increased in proportion to a vehicle mileage. For the PnG coast mode 'PnG_coast', fuel consumption in the acceleration phase (pulse phase) is greater than in the PnG cruise control mode 'PnG_const' but, in the deceleration phase (coast phase), there is no fuel consumption based on coasting in a fuel cut or engine complete stop state and, thus, an accumulative value of total fuel consumption may be reduced compared with the PnG cruise control mode 'PnG_const'.

In addition, an operating point in the acceleration phase (pulse phase) may be close to the SS and, accordingly, the vehicle may be driven in a period with improved engine efficiency, enhancing fuel efficiency. In the PnG glide mode 'PnG_glide', the acceleration phase (pulse phase) is the same as the PnG coast mode 'PnG_coast' but, in the deceleration phase (glide phase), a portion of energy regenerated by a motor is directly used to drive the vehicle and, thus, an actual vehicle mileage may be extended.

The method described herein is capable of minimizing reduction in energy efficiency based on circulation of an electrical system of regenerative energy. In particular, in the deceleration phase (glide phase), energy that corresponds to minimum driving demand torque (Idle) is additionally consumed and, total energy consumption may also be reduced compared with the PnG cruise control mode 'PnG_const'. According to the present invention, the auto cruise control method may apply a PnG driving pattern obtained by considering the characteristics of the HEV to maximize an effect of enhancing fuel efficiency.

According to the present invention, in the auto cruise control method, a PnG mode may be subdivided and one mode may be automatically selected among the PnG cruise control mode, the PnG coast mode, and the PnG glide mode for each vehicle driving period from a map set by a controller and, thus, driving may be advantageously and automatically performed in an optimal PnG mode without separate intervention of a driver. In addition, driving in the PnG glide mode obtained by considering advantages of both the PnG cruise control mode and PnG coast mode may be performed and, thus, it may be possible to drive the vehicle to satisfy enhancement in driveability and fuel efficiency.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An auto cruise control method for a hybrid electric vehicle, comprising:
   receiving, by a controller, a target vehicle speed by a driver input to turn on an auto cruise mode and to turn on a pulse and glide (PnG) mode in a hybrid electric vehicle (HEV) using an engine and a driving motor as vehicle driving sources;
   selecting, by the controller, one PnG mode among a PnG coast mode, a PnG glide mode, and a PnG cruise control mode from a map based on the target vehicle speed; and
   operating, by the controller, the vehicle in the selected PnG mode,
   wherein the PnG coast mode is a mode in which vehicle acceleration (pulse phase) and deceleration (coast phase) are alternately repeated between a set upper target vehicle speed limit and a lower target vehicle speed limit and coasting is performed by vehicle inertia during deceleration,
   wherein the PnG glide mode is a mode in which vehicle acceleration (pulse phase) and deceleration (glide phase) are alternately repeated between the set upper target vehicle speed limit and the lower target vehicle speed limit and deceleration driving that maintains a determined speed profile based on torque assist of a driving motor and vehicle inertia during deceleration is performed, and
   wherein the PnG cruise control mode is a cruise driving mode for maintaining the target vehicle speed set using the vehicle driving sources.

2. The method of claim 1, further comprising:
   providing, by the controller, a user interface (UI) on a UI device for driver selection of one mode from an driveability priority mode and a fuel efficiency priority mode while the auto cruise mode is turned on and the PnG mode is turned on,
   wherein the UI device is connected to the controller to receive the driver selection of a mode selection signal; and
   wherein the map is configured to select one PnG mode determined based on the selected mode among the driveability priority mode and the fuel efficiency priority mode.

3. The method of claim 2, wherein the map is configured to select the PnG coast mode when the selected mode is the fuel efficiency priority mode.

4. The method of claim 2, wherein the map is configured to select one PnG mode among the PnG coast mode, the PnG glide mode, and the PnG cruise control mode based on mode selection information and the target vehicle speed using the target vehicle speed and the mode selection information of the fuel efficiency priority mode and the driveability priority mode, as input.

5. The method of claim 4, wherein the map is configured to select one PnG mode based on the target vehicle speed from the PnG cruise control mode and the PnG glide mode when the selected mode is the driveability priority mode.

6. The method of claim 5, wherein the map is configured to select the PnG cruise control mode when the target vehicle speed is equal to or less than predetermined reference vehicle speed and to select the PnG glide mode when the target vehicle speed is greater than the reference vehicle speed.

7. The method of claim 2, wherein a vehicle speed variation amount (Δ vehicle speed) is set as a value based on the target vehicle speed in the map and the controller is configured to determine the upper target vehicle speed limit and the lower target vehicle speed limit to which the determined vehicle speed variation amount is applied, based on the target vehicle speed, when the vehicle speed variation amount that corresponds to the target vehicle speed from the map is obtained.

8. The method of claim 7, wherein a vehicle speed variation amount (Δ vehicle speed) of the PnG coast mode is set to be greater than a vehicle speed variation amount (Δ vehicle speed) of the PnG glide mode in the map.

9. The method of claim 1, wherein when the PnG coast mode or the PnG glide mode is selected from the map, the controller is configured to operate the vehicle based on a set speed increase inclination during acceleration of each mode to increase vehicle speed until the vehicle speed reaches the upper target vehicle speed limit.

10. The method of claim 1, wherein when the PnG glide mode is selected from the map, the controller is configure to operate the vehicle to perform deceleration of the determined speed profile based on deceleration setting information obtained from a separate map.

11. The method of claim 10, wherein the deceleration setting information includes a torque assist amount of the driving motor.

12. The method of claim 10, wherein the deceleration setting information includes a deceleration inclination.

13. The method of claim 1, wherein torque generation of the driving motor is adjusted to decelerate the vehicle with a lower deceleration inclination than in deceleration in the PnG coast mode during deceleration in the PnG glide mode.

14. The method of claim 1, wherein when the PnG mode is turned off while the target vehicle speed is set to turn on the auto cruise mode, the controller is configured to perform the cruise driving mode for maintaining the target vehicle speed using the vehicle driving sources.

15. The method of claim 1, wherein when battery state of charge (SOC) is within a preset range while a vehicle is driven in one PnG mode selected from the PnG coast mode, the PnG glide mode, and the PnG cruise control mode, driving in a corresponding PnG mode is maintained.

16. The method of claim 15, wherein when the battery SOC is out of the set range while the vehicle is driven in one PnG mode selected from the PnG coast mode, the PnG glide mode, and the PnG cruise control mode, the vehicle is driven in the cruise driving mode for maintaining the target vehicle speed using the vehicle driving sources.

17. The method of claim 1, wherein during deceleration in the PnG coast mode, an engine clutch disposed between the engine and the driving motor is opened and transmission neutralization is performed and the engine is maintained in a fuel cut or engine complete stop state.

18. The method of claim 1, wherein during deceleration of the PnG coast mode, an engine clutch disposed between the engine and the driving motor is opened and the engine is maintained in a fuel cut or engine complete stop state and energy based on the driving motor is recovered while a transmission is in an in-gear state.

19. The method of claim 1, wherein during deceleration in the PnG glide mode, an engine clutch disposed between the engine and the driving motor is opened, a transmission is maintained in an in-gear state, and the engine is maintained in a fuel cut or engine complete stop state.

* * * * *